(12) United States Patent
Lin

(10) Patent No.: US 7,064,802 B2
(45) Date of Patent: Jun. 20, 2006

(54) TRANSFLECTIVE LCD WITH COMMON AND PIXEL ELECTRODES ON LOWER SUBSTRATES SPACED AT A LARGER INTERVAL IN THE REFLECTIVE REGION

(75) Inventor: Ching-Huan Lin, Hsin Ying (TW)

(73) Assignee: AU Optronics Corp., Hsinchu (TW)

( * ) Notice: Subject to any disclaimer, the term of this patent is extended or adjusted under 35 U.S.C. 154(b) by 166 days.

(21) Appl. No.: 10/890,142

(22) Filed: Jul. 14, 2004

(65) Prior Publication Data

US 2005/0083462 A1    Apr. 21, 2005

(30) Foreign Application Priority Data

Oct. 21, 2003    (TW) ............................... 92129124 A

(51) Int. Cl.
*G02F 1/1343*    (2006.01)
(52) U.S. Cl. ........................ 349/141; 349/114; 349/113
(58) Field of Classification Search ................ 349/141, 349/114, 113
See application file for complete search history.

(56) References Cited

U.S. PATENT DOCUMENTS

| 6,160,600 A | * | 12/2000 | Yamazaki et al. | .......... 349/138 |
| 2005/0140867 A1 | * | 6/2005 | Choi | .......................... 349/114 |

\* cited by examiner

*Primary Examiner*—Andrew Schechter
*Assistant Examiner*—Phu Vu
(74) *Attorney, Agent, or Firm*—Troxell Law Office, PLLC

(57) ABSTRACT

A pixel device of a transflective liquid crystal display (LCD) having a hybrid alignment nematic liquid crystal layer driven by a lateral electric field. The pixel device of the transflective LCD includes an upper panel and a lower panel, in which the lower panel has an upper surface divided into a reflective region covered with a reflector and a remainder transmission region.

20 Claims, 5 Drawing Sheets

TRANSFLECTIVE LCD WITH COMMON AND PIXEL ELECTRODES ON LOWER SUBSTRATES SPACED AT A LARGER INTERVAL IN THE REFLECTIVE REGION

BACKGROUND OF THE INVENTION (1) Field of the Invention

The present invention relates to a pixel device of a transflective liquid crystal display (LCD), and more particularly to a pixel device having a hybrid alignment nematic liquid crystal layer driven by a lateral electric field.

(2) Description of Related Art

Along with enormous promotions upon thin film transistor (TFT) fabrication technique, liquid crystal displays (LCD) are broadly adopted to personal digital assistants (PDA), notebooks (NB), digital cameras (DC), digital videos (DV), mobile phones, etc. In an LCD panel, a cold cathode fluorescent lamp (CCFL) is included as a backlight source. The backlight source provides light to pass through layers of optical films including a diffusion film, a polarizer, etc., and to thereafter form a uniform planar image on the LCD.

Generally, most of light emitted from the backlight source is absorbed while passing through the optical films and the liquid crystal panel. As a result, less than 10% of the light can leave the liquid crystal panel to display images. To solve the above-described problem, a reflective LCD introduces ambient light source to replace the CCFL and the related optical films. By adopting the ambient light source, power consumption of the LCD can be reduced and the size and weight of the LCD display can also be minimized. However, visibility of the reflective LCD is poor when the environment is too dark to provide enough ambient light.

In order to overcome the above-described problem, a transflective LCD has been developed by utilizing both a transmission mode and a reflective mode in a single display. The transflective LCD can alternatively use the ambient light or the backlight as its light source. Therefore, in a fair ambient light condition, the ambient light is used to reduce power consumption. On the other hand, in a poor ambient light condition, the backlight is used so as to achieve a better illumination.

FIG. 1 shows a pixel structure of a typical normal-black (NB) transflective LCD. The pixel structure comprises an upper panel 100, a lower panel 300, and a liquid crystal (LC) layer 200 in between. The upper panel 100 has a glass substrate 108 as a main body. A quarter wave plate (QWP) 106 and a first polarizer 104 are stacked on an upper surface of the glass substrate 108, and a color filter (CF) 102 and a common electrode 110 are stacked under a lower surface of the glass substrate 108. The lower panel 300 has a glass substrate 308 as a main body. Another QWP 306 and a second polarizer 304 are stacked under a lower surface of the glass substrate 308, and a reflector 314 for forming a reflector-covered reflective region and a transmission region cover a portion of an upper surface of the glass substrate 308. A pixel electrode 310 as shown is formed over the reflective region and the transmission region of the reflector 314 and also covers the glass substrate 308. The LC layer 200 for imaging is driven by the electric field formed between the common electrode 110 and the pixel electrode 310.

FIGS. 2A and 2B shows operation principles of the transflective LCD of FIG. 1 with no operation voltage. In the reflective region, as shown in FIG. 2A, the ambient light A initially passes through the first polarizer 104 to form a linear polarized light A1. A principal axis of the QWP 106 is arranged to form a 45-degree angle with respect to the transmission axis (shown in a dotted line) of the first polarizer 104, such that the linear polarized light A1 can be converted into a circularly polarized light A2 after penetrating the QWP 106. The circularly polarized light A2 can then pass through the LC layer (not shown in this figure) and be reflected back into the LC layer again by the reflector 314. In this application, because no operating voltage is applied to the LC layer, another circularly polarized light (not shown in this figure) having an opposite orientation with respect to the circularly polarized light A2 can be formed and pass through the QWP 106 to form another linearly polarized light A3. It is noted that the linearly polarized light A1 is perpendicular to the linearly polarized light A3. That is, the linearly polarized light A3 makes a 90-degree angle with respect to the first polarizer 104 and thus cannot penetrate the first polarizer 104.

In the transmission region, as shown in FIG. 2B, the backlight B initially passes through the second polarizer 304 to form a linearly polarized light B1, and then the B1 passes through the QWP 306, the LC layer (not shown in this figure), and the QWP 106. The LC layer does not affect the polarization of the linearly polarized light B1 if no operation voltage is applied, and the fast axes of QWP 306 and 106 are perpendicular to each other to result in zero combined retardation. Thereby, the linearly polarized light B1 is converted into a linearly polarized light B2 with identical polarizing direction. Furthermore, because the transmission axis of the first polarizer 104 makes a 90-degree angle with respect to that of the second polarizer 304, so the linearly polarized light B2 cannot penetrate the first polarizer 104.

FIGS. 3A and 3B shows operation principles of the transflective LCD of FIG. 1 when an operation voltage applied. In the reflective region, as shown in FIG. 3A, the ambient light A initially passes through the first polarizer 104 to form a linear polarized light A4, and then the A4 passes through the QWP 106. For the principal axis of the QWP 106 makes a 45-degree angle with respect to the transmission axis of the first polarizer 104, so the linear polarized light A4 can be converted into a circularly polarized light A5 after leaving the QWP 106. The circularly polarized light A5 then passes through the LC layer 200 but reflected back into the LC layer 200 again by the reflector 314. To optimize reflective displaying brightness, the LC layer 200 is set with quarter-wave retardation by adjusting the operating voltage and the thickness of the LC layer 200 such that the circularly polarized light A5 can be converted into a circularly polarized light A6 with identical polarizing orientation. The circularly polarized light A6 then passes through the QWP 106 and is converted into a linearly polarized light A7 which has an identical polarized direction with respect to the transmission axis of the first polarizer 104. The light A7 can fully penetrate the first polarizer 104.

In the transmission region as shown in FIG. 3B, the backlight B initially passes through the second polarizer 304 to form a linearly polarized light B3, and then the B3 passes through the QWP 306, the LC layer 200, and the QWP 106 to form a polarized light B4. To optimize transmission displaying brightness, the LC layer 200 is set with half-wave retardation by adjusting the operation voltage and the thickness of the LC layer 200. Upon such an arrangement, the linearly polarized light B3 can be converted into the linearly polarized light B4 whose polarizing direction makes a 90-degree angle with respect to that of the linear polarized light B3. Furthermore, because the transmission axis of the first polarizer 104 makes a 90-degree angle with respect to that of the second polarizer 304, so the linearly polarized light B2 can fully penetrate the first polarizer 104.

It should be noted that, in the traditional transflective LCD of FIG. 1, the distances between the pixel electrode 310 and the common electrode 110 of the reflective region or that of the transmission region are the same. Therefore, the LC layer 200 on the reflective region and that on the transmission region is under the same strength of the electric field. Under the condition of optimum reflective displaying brightness, the LC layer 200 is set with quarter-wave retardation, while the LC layer 200 is set with half-wave retardation to optimize the transmission displaying brightness Thus, a compromise should be made between these two optimal conditions for the reflective and the transmission displaying brightness, and also an induced descent on the visibility of the LCD should be resolved.

Accordingly, there is definite a need of providing a pixel device of transflective LCD having different electric field strength in reflective and transmission regions so as to reach an optimal condition for both reflective and transmission displaying brightness.

SUMMARY OF THE INVENTION

The object of the present invention is to promote the visibility of the transflective LCD and change the amount of retardation in the reflective region and the transmission region thereof by controlling the electric field strength thereof of the transflective LCD.

The pixel device of the tranflective LCD in the present invention comprises an upper panel and a lower panel, in which the lower panel has an upper surface divided into a reflective region covered with a reflector and a remainder transmission region. A hybrid-type nematic LC layer is interposed between the upper panel and the lower panel. A first pixel electrode and a first common electrode are both formed on the reflective region but spaced with a first interval so as to form a lateral electric field for driving the LC layer. On the other hand, a second pixel electrode and a second common electrode are formed on the transmission region with a second interval to form another lateral electric field for driving the LC layer. By having the first interval larger than the second interval, a smaller retardation can exist in the LC layer on the reflective region with respect to that on the transmission region in the case that an operating voltage is applied to the pixel device.

Reference will now be made in detail to the preferred embodiments of the present invention, examples of which are illustrated in the accompanying drawings. Wherever possible, the same reference numbers will be used throughout the drawings to refer to the same or like parts.

BRIEF DESCRIPTION OF THE DRAWINGS

The present invention will now be specified with reference to its preferred embodiments illustrated in the drawings, in which.

DETAIL DESCRIPTION OF THE PREFERRED EMBODIMENTS

The invention disclosed herein is directed to a pixel device of a transflective LCD. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 4:
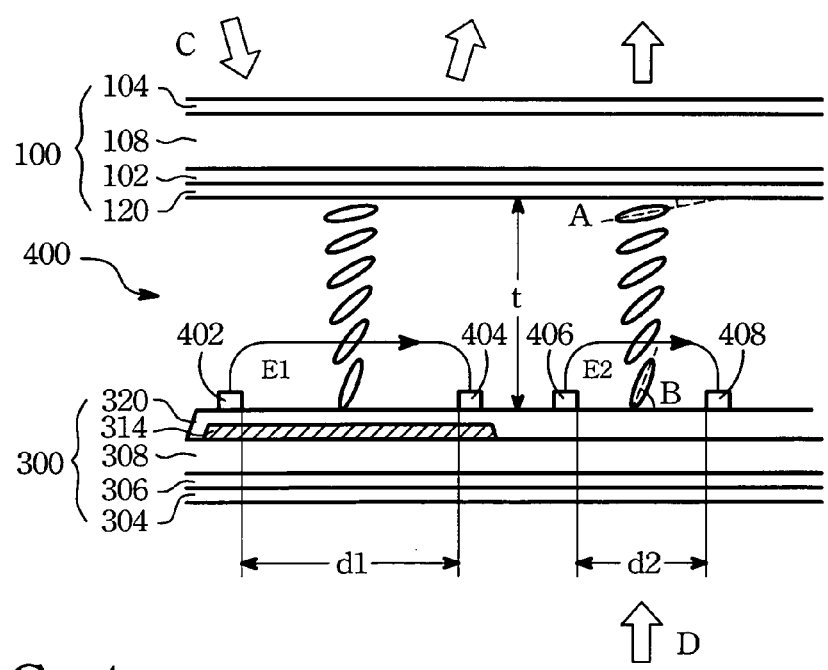
FIG. 4 depicts a schematic cross-section view of a preferred embodiment of the pixel device of a transflective LCD in accordance with the present invention.

FIG. 4 is a schematic cross-sectional view of a pixel device of a transflective LCD according to the present invention. The pixel device comprises an upper panel 100, a lower panel 300, and an interposed nematic LC layer 400. The upper panel 100 includes a glass substrate 108 as a main body, a polarizer 104 formed on the glass substrate 108, and a color filter 102 and a first alignment layer 120 stacked on a lower surface of the glass substrate 108. The first alignment layer 120 is there to tilt neighboring molecules in the LC layer 400 by a first pre-tilt angle A. The lower panel 300 includes another glass substrate 308, a QWP 306 located under a lower surface of the glass substrate 308, and a second polarizer 304 located under the QWP 306. A reflector 314 is formed on an upper surface of the glass substrate 308 and separates the upper surface into a shielded reflective region and a transmission region. Moreover, a second alignment layer 320 is formed on both the reflective region and the transmission region and thus covers the reflector 314 as well. The second alignment layer 320 is then used to tilt neighboring molecules in the LC layer 400 by a second pre-tilt angle B.

A first pixel electrode 402 and a first common electrode 404 are formed on the second alignment layer 320 with a first interval d1 so as to induce a lateral electric field E1 in the reflective region. Similarly, a second pixel electrode 406 and a second common electrode 408 are formed on the second alignment layer 320 with a second interval d2 to induce another lateral electric field E2 in the transmission region. It should be noted that the first interval d1 is larger than the second interval d2 in the present invention, such that the electric field E2 in the reflective region can be smaller than the E1 in the transmission region. Furthermore, the electrodes 402,404,406,408 are preferably composed of transparency conductive material, such as ITO, to increase illumination efficiency.

The second pre-tilt angle B may be preferably close to 90 degree so as to provide a vertical aligning effect, while a first pre-tilt angle A is close to 0 degree so as to provide a lateral aligning effect, or the first pre-tilt angle A close to 90 degree so as to provide a vertical aligning effect, while a second pre-tilt angle B close to 0 degree so as to provide a lateral aligning effect. As a result, molecules in the LC layer 400 between the upper panel 100 and the lower panel 300 are formed, as shown, according to a pattern of hybrid-type alignment, which tilts gradually the molecules from an angle A to another angle B. Furthermore, when an operating voltage is applied to the LC layer 400, the above-described lateral electric fields E1 and E2 can drive the vertical aligned LC molecules neighboring the second alignment layer 320 to be lateral aligned, so as to change the transparency of the LC layer 400 and to form a corresponding image.

In a preferred embodiment, the pixel electrodes 402, 406 and the common electrodes 404, 408 can be silt in shape to form a uniform lateral electric field over the lower panel 300. Moreover, by adjusting the spacing t between the upper panel 100 and the lower panel 300, the first pre-tilt angle A, and the second pre-tilt angle B, the hybrid-type nematic LC layer 400 can be set with quarter-wave retardation before an operating voltage is applied to the pixel device. In addition, by adjusting the first interval d1 and the second interval d2, the LC layer 400 in the reflective region can be set with half-wave retardation, and that in the transmission region is set with ¾-wave retardation.

Figure 5A:
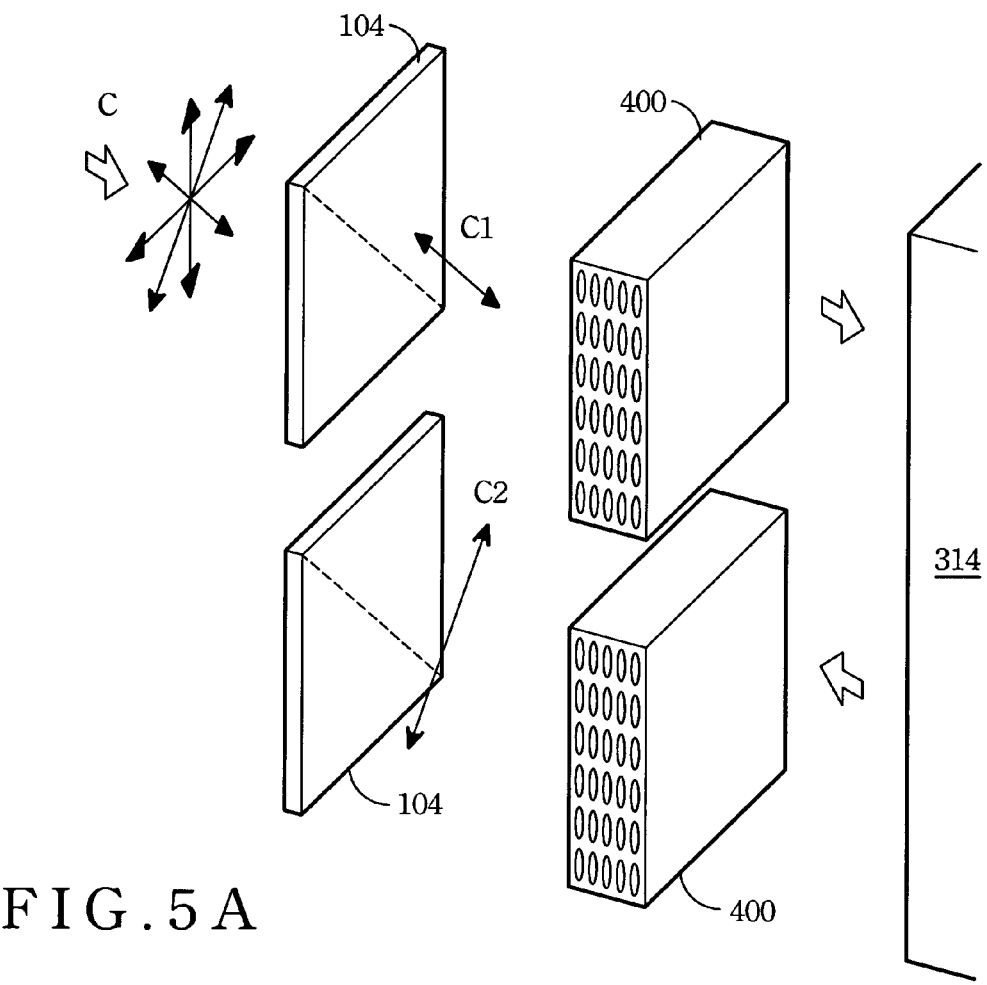
FIG. 5A depicts a schematic cross-section view in the reflective region of the pixel device of FIG. 4 when no operating voltage is applied.

FIG. 5A is a schematic cross-sectional view in the reflective region of the pixel device of FIG. 4 when no operating voltage is applied. As shown, the ambient light C initially passes through the polarizer 104 to form a linearly polarized light C1. The linearly polarized light C1 then passes through the LC layer 400 and reflected by the reflector 314 back into the LC layer 400 again. As mentioned, because the LC layer 400 is set with quarter-wave retardation, the linearly polarized light C1 will suffer a half-wave retardation by passing through the LC layer 400 twice, and thereby become a linearly polarized light C2 leaving the LC layer 400. The linearly polarized light C2 has a polarizing direction perpendicular to the linear polarized light C1 and thus cannot penetrate the first polarizer 104.

Figure 5B:
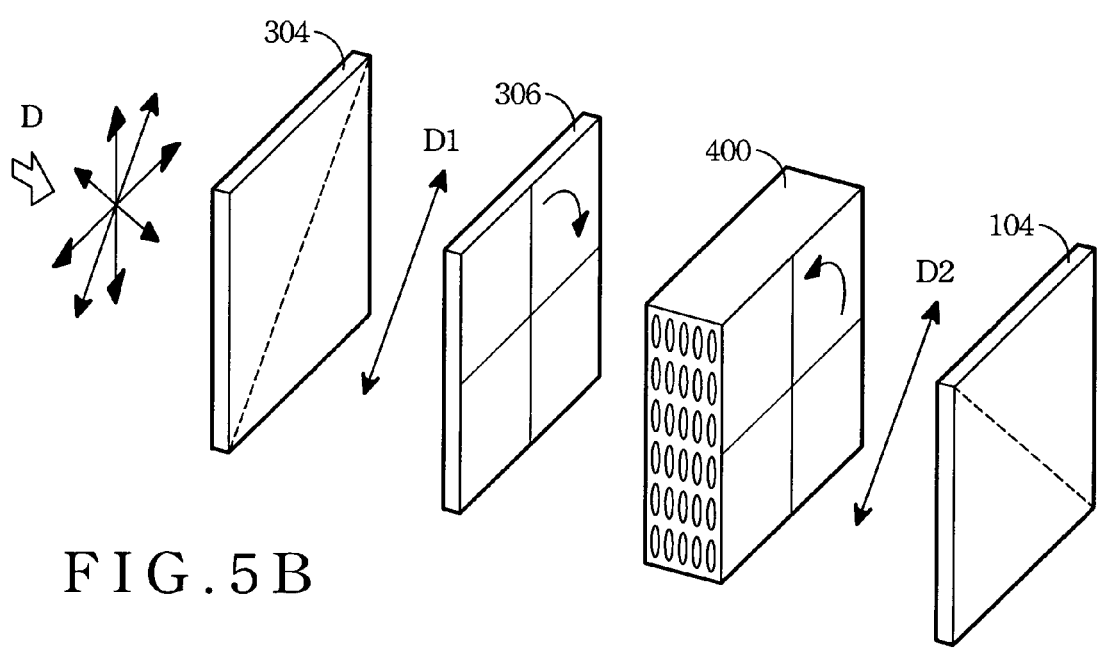
FIG. 5B depicts a schematic cross-section view in the transmission region of the pixel device of FIG. 4 when no operating voltage is applied.

FIG. 5B is a schematic cross-sectional view in the transmission region of the pixel device of FIG. 4 when no operating voltage is applied. As shown, the backlight D initially passes through the second polarizer 304 to form a linearly polarized light D1. The linearly polarized light D1 then passes through the QWP 306 and the LC layer 400 to form a polarized light D2. Because the QWP 306 has a fast axis perpendicular to that of the LC layer 400, so the retardation thereof is cancelled with each other and thus make the polarized light D2 a linearly polarized light with polarizing direction identical to the linearly polarized light D1. Moreover, because the transmission axis of the first polarizer 104 makes an angle of 90 degrees with respect to that of the second polarizer 304, the linearly polarized light D2 cannot penetrate the first polarizer 104.

Figure 6A:
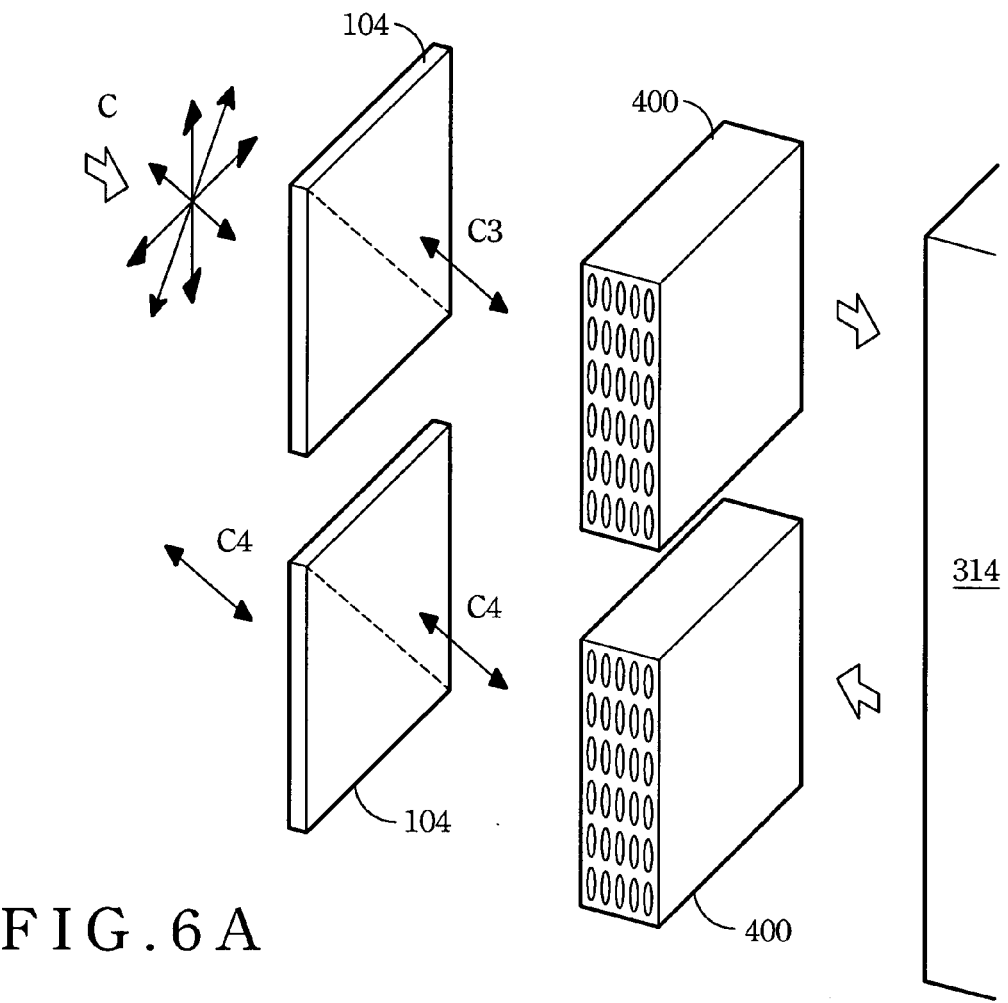
FIG. 6A depicts a schematic cross-section view in the reflective region of the pixel device of FIG. 4 when an operating voltage is applied.

FIG. 6A is a schematic cross-sectional view in the reflective region of the pixel device of FIG. 4 when an operating voltage is applied. As shown, the ambient light C initially passes through the polarizer 104 to form a linearly polarized light C3. The linearly polarized light C3 then passes through the LC layer 400 and reflected by the reflector 314 back into the LC layer 400 again. By controlling the operating voltage between the pixel electrode 402 and the common electrode 404 (referred to FIG. 4), the LC layer 400 can be set with half-wave retardation, and so the linearly polarized light C3 will suffer a fully-wave retardation by passing through the LC layer 400 twice so as to form a linearly polarized light C4 leaving the LC layer 400. It should be noted that the linearly polarized light C4 has a polarizing direction identical to the transmission axis of the first polarizer 104, so that the linearly polarized light C4 can fully penetrate the first polarizer 104.

Figure 6B:
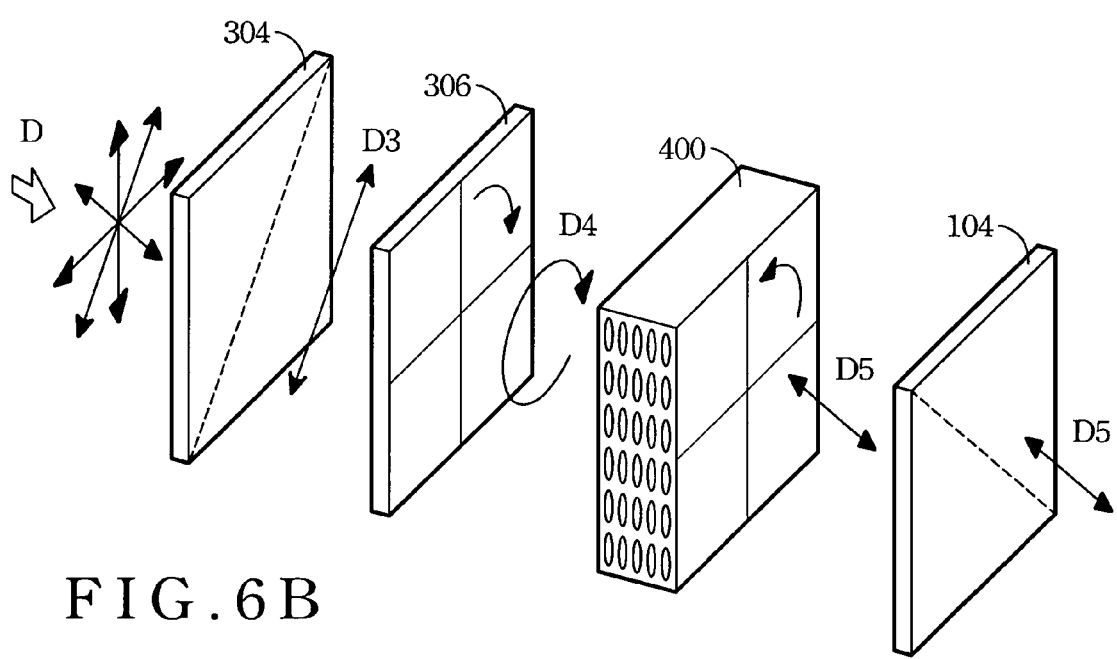
FIG. 6B depicts a schematic cross-section view in the transmission region of the pixel device of FIG. 4 when an operating voltage is applied.

FIG. 6B is a schematic cross-sectional view in the transmission region of the pixel device of FIG. 4 when an operating voltage is applied. As shown, the backlight D initially passes through the second polarizer 304 to form a linearly polarized light D3. Because the main axis of the QWP 306 makes an angle of 45 degree with respect to the transmission axis of the second polarizer 304, so the linearly polarized light D3 can penetrate the QWP 306 and becomes a circularly polarized light D4. By controlling the operating voltage applied between the pixel electrode 406 and the common electrode 408 (see FIG. 4), the LC layer 400 forms three-fourth wave retardation. By further adjusting the direction of the fast axes of the LC layer 400 and the QWP 306, the quarter-wave retardation of the QWP 306 can be cancelled by that of the LC layer 400, and the linearly polarized light D3 will become a linearly polarized light D5 with perpendicular polarized direction while leaving the LC layer 400. The transmission axis of the first polarizer 104 is perpendicular to that of the second polarizer 304, so that the linearly polarized light D5 can fully penetrate the first polarizer 104.

Moreover, it is noted that the upper panel 100 may further comprises a half wave plate (HWP) (not shown) stacked below the first polarizer 104, and the lower panel 300 may further comprises a respective HWP (not shown) stacked above the second polarizer 304. The two HWPs are used to increase an effective frequency range that the QWPs 106 and 306 can properly operate.

Figure 1:
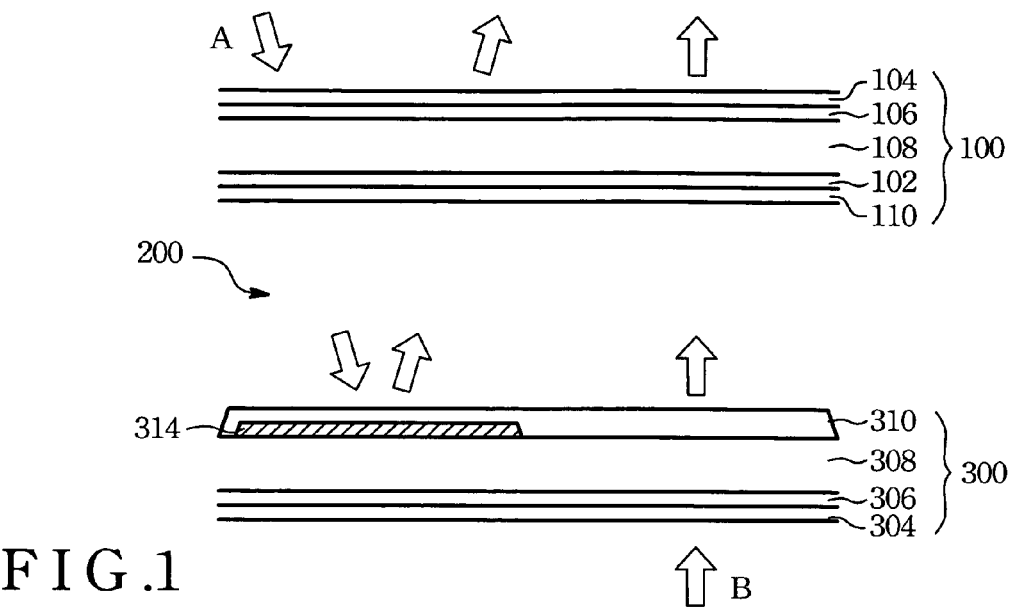
FIG. 1 depicts a schematic cross-section view of a pixel device of a tradition normal-black transflective LCD.
Figure 2A:
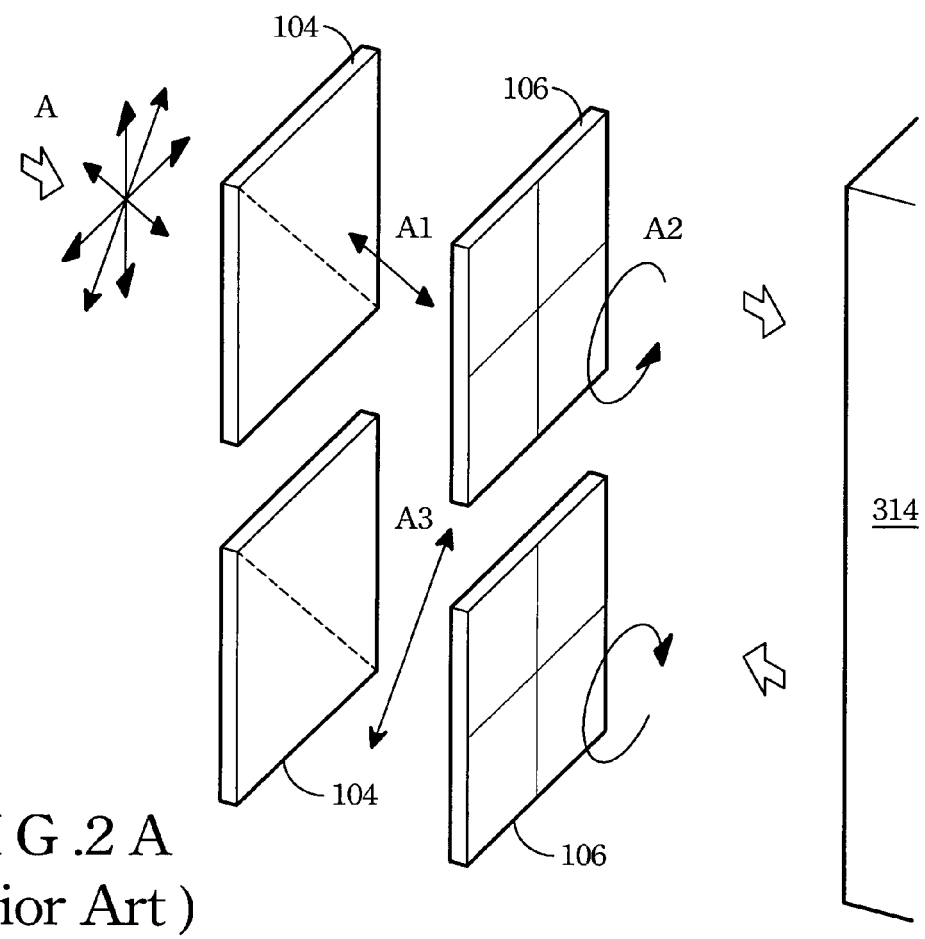
FIG. 2A depicts a schematic cross-section view in the reflective region of the pixel device of FIG. 1 when no operating voltage is applied.
Figure 2B:
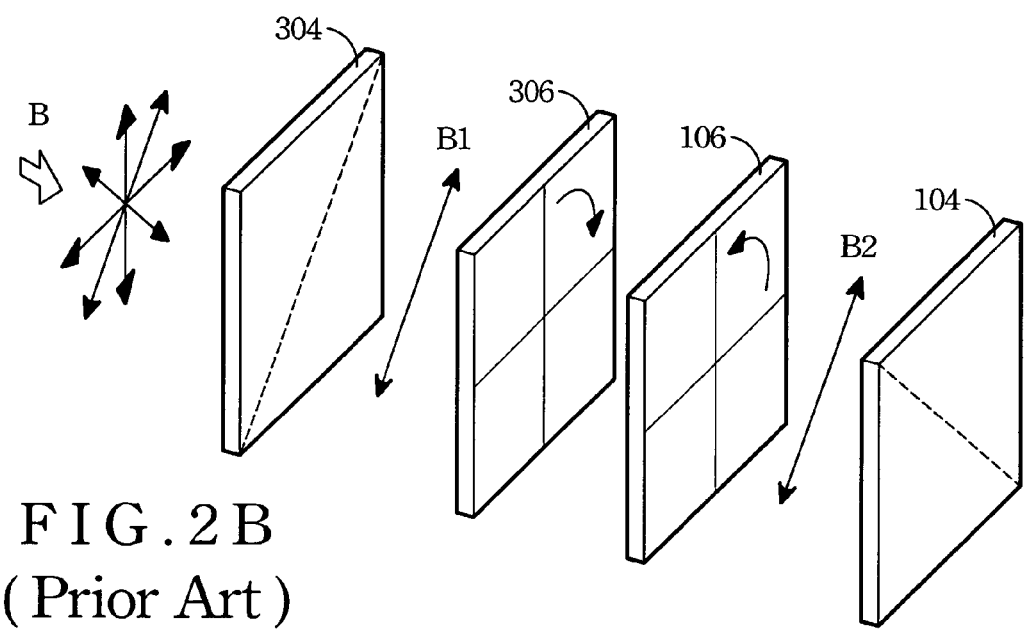
FIG. 2B depicts a schematic cross-section view in the transmission region of the pixel device of FIG. 1 when no operating voltage is applied.
Figure 3A:
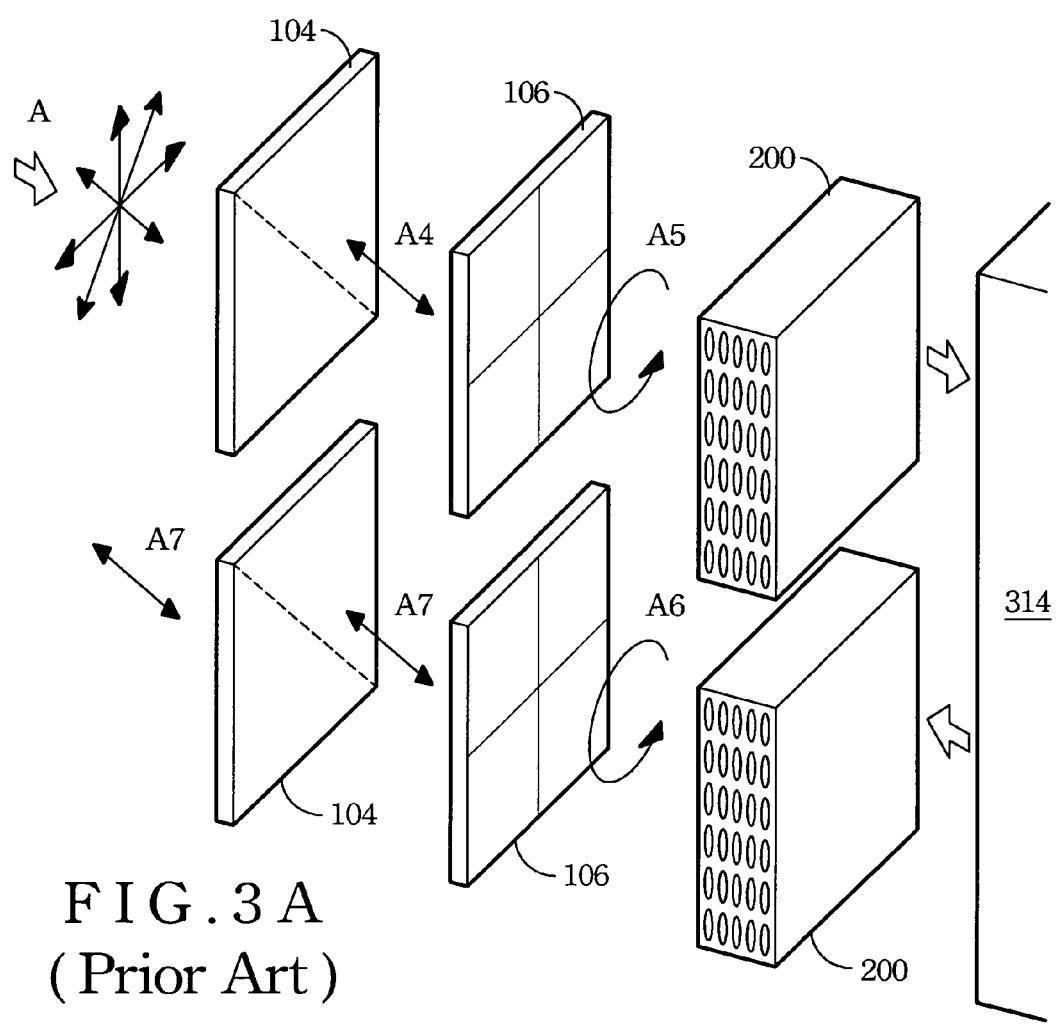
FIG. 3A depicts a schematic cross-section view in the reflective region of the pixel device of FIG. 1 when an operating voltage is applied.
Figure 3B:
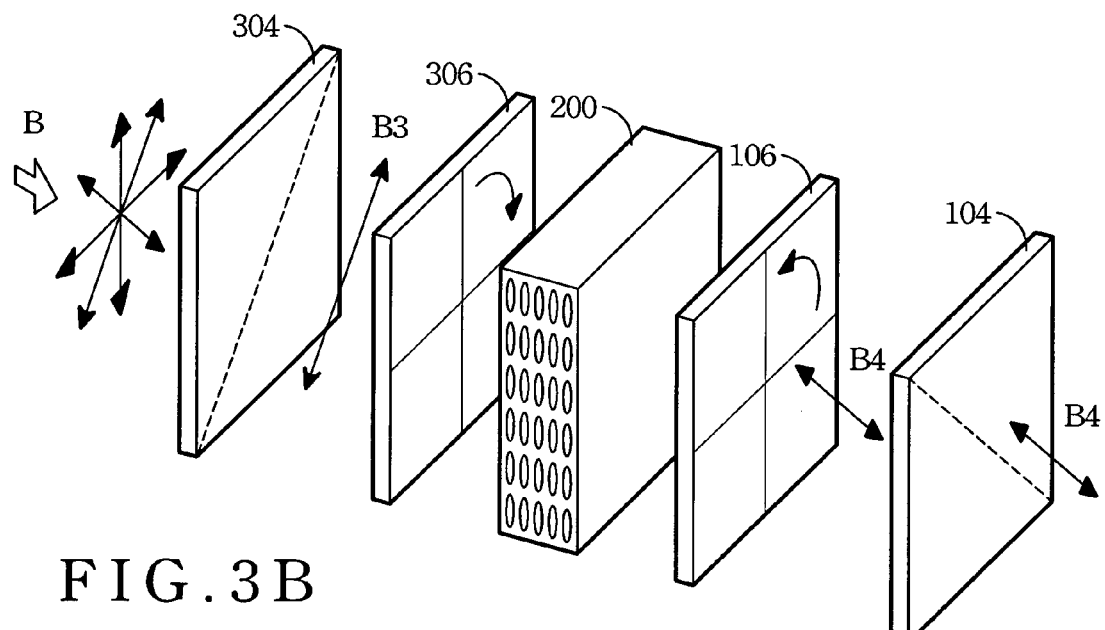
FIG. 3B depicts a schematic cross-section view in the transmission region of the pixel device of FIG. 1 when an operating voltage is applied.

As mentioned in the above paragraphs, it is clearly that the pixel device in accordance with the present invention is applied in normal-black transflective LCD. By further contrast to the traditional transflective LCD of FIG. 1, the transflective LCD according to the present invention has the following advantages:

1. In the pixel device of the present invention, the first interval d1 and the second interval d2 dominate the strength of the lateral electric field in the reflective region E1 and that in the transmission region E2. Therefore, the hybrid-type LC layer 400 in the reflective region and the transmission region can have different retardation by controlling the interval d1 and d2 to obtain both the optimum reflective brightness and the optimum transmission brightness.
2. When no operating voltage is applied, the hybrid-type nematic LC layer 400 in accordance with the present invention is set with quarter-wave retardation to functionally replace the QWP 106 in the traditional transflective LCD of FIG. 1. Therefore, the transflective LCD of the present invention needs only one QWP 306.
3. The hybrid-type nematic LC layer has a response speed faster than that of super-twist nematic (STN) LC layer 200. Therefore, the transflective LCD in accordance with the present invention presents a shorter response time.

With the example and explanations above, the features and spirits of the invention will be hopefully well described. Those skilled in the art will readily observe that numerous modifications and alterations of the device may be made when retaining the teaching of the invention. Accordingly, the above disclosure should be construed as limited only by the metes and bounds of the appended claims.

What is claimed is:

1. A pixel device of a transflective-type LCD, comprising:
   an upper panel;
   a lower panel, located under said upper panel, having an upper surface separated into a reflective region covered with a reflector and a transmission region;
   a hybrid-type nematic LC layer, interposed between said upper panel and said lower panel;
   a first pixel electrode and a first common electrode, formed separately on said reflective region, spaced by a first interval to form a lateral electric field for driving said hybrid-type nematic LC layer; and
   a second pixel electrode and a second common electrode, formed separately on said transmission region, spaced by a second interval to form another lateral electric field for driving said hybrid-type nematic LC layer, and said first interval being larger than said second interval;
   wherein, while an operating voltage is applied to said pixel device, a smaller retardation is formed in said hybrid-type nematic LC layer of said reflective region with respect to that of said transmission region.

2. The pixel device as claimed in claim 1, wherein said hybrid-type nematic LC layer is set with quarter-wave retardation so as to operate as a quarter wave plate before said operating voltage is applied to said pixel device.

3. The pixel device as claimed in claim 1, wherein said upper panel has a first alignment layer stacked on a lower surface thereof, said lower panel has a second alignment layer stacked on an upper surface thereof, and a pre-tilt angle of said second alignment layer is larger than another pre-tilt angle of said first alignment layer.

4. The pixel device as claimed in claim 1, wherein said upper panel has a first alignment layer stacked on a lower surface thereof, said lower panel has a second alignment layer stacked on an upper surface thereof, and a pre-tilt angle of said second alignment layer is smaller than another pre-tilt angle of said first alignment layer.

5. The pixel device as claimed in claim 1, wherein said upper panel has an lateral alignment layer stacked on a lower surface thereof and said lower panel further has a vertical alignment layer stacked on an upper surface thereof to form said hybrid type nematic LC layer.

6. The pixel device as claimed in claim 1, wherein said upper panel has an vertical alignment layer stacked on a lower surface thereof and said lower panel has a lateral alignment layer stacked on an upper surface thereof to form said hybrid-type nematic LC layer.

7. The pixel device as claimed in claim 1, wherein said lower panel has a glass substrate and a QWP (quarter wave plate) stacked on a lower surface of said glass substrate.

8. The pixel device as claimed in claim 1, wherein said upper panel has a glass substrate further having an upper surface, a first polarizer is stacked on said upper surface, said lower panel has another glass substrate further having a lower surface, a QWP and a second polarizer are stacked on said lower surface thereof, and a transmission axis of said first polarizer makes a 90-degree angle with respect to another transmission axis of said second polarizer.

9. The pixel device as claim in claim 8, wherein said upper panel further comprises an HWP stacked below said first polarizer, and said lower panel further comprises another HWP stacked above said second polarizer.

10. The pixel device as claimed in claim 1, wherein said first and second pixel electrodes and said first and second common electrodes are made of ITO.

11. The pixel device as claimed in claim 1, wherein said first and second pixel electrodes and said first and second common electrodes are slit in shape.

12. The pixel device as claimed in claim 1, wherein said LCD is a normal-black transflective LCD.

13. A pixel device of a transflective LCD panel, comprising:
    an upper panel, having an upper surface, the upper surface further stacking a first polarizer;
    a lower panel, located under said upper panel, further having a lower surface and an opposing upper surface, the lower surface further stacking a QWP and a second polarizer, the upper surface separated into a reflective region covered with a reflector and a transmission region;
    a hybrid-type nematic LC layer, interposed between said upper panel and said lower panel, having quarter-wave retardation when no operation voltage is applied;
    a first pixel electrode and a first common electrode, both with slit in shape formed on said reflective region, spaced by a first interval to form a lateral electric field for driving said hybrid-type nematic LC layer;
    a second pixel electrode and a second common electrode, both with slit in shape formed on said transmission region, spaced by a second interval to form a lateral electric field for driving said hybrid-type nematic LC layer, and said first interval being larger than said second interval;
    wherein, while an operation voltage is applied to said pixel device, half-wave retardation is formed in said hybrid-type nematic LC layer over said reflective region, and three-fourth wave retardation is formed in said hybrid-type nematic LC layer over said transmission region.

14. The pixel device as claimed in claim 13, wherein said upper panel having a first alignment layer stacked on a lower surface thereof, said lower panel having a second alignment layer stacked on an upper surface thereof, and a pre-tilt angle of said second alignment layer is larger than another pre-tilt angle of said first alignment layer.

15. The pixel device as claimed in claim 13, wherein said upper panel has a first alignment layer stacked on a lower surface thereof, said lower panel has a second alignment layer stacked on an upper surface thereof, and a pre-tilt angle of said second alignment layer is smaller than another pre-tilt angle of said first alignment layer.

16. The pixel device as claimed in claim 13, wherein said upper panel has a lateral alignment layer stacked on a lower panel thereof and said lower panel has a vertical alignment layer stacked on an upper panel thereof.

17. The pixel device as claimed in claim 13, wherein said upper panel has a vertical alignment layer stacked on a lower panel thereof and said lower panel has a lateral alignment layer stacked on an upper panel thereof.

18. The pixel device as claim in claim 13, wherein said upper panel further comprises an HWP formed below said first polarizer, and said lower panel further comprises an HWP formed above said second polarizer.

19. The pixel device as claimed in claim 1, wherein said first and second pixel electrodes and said first and second common electrodes are made of ITO.

20. The pixel device as claimed in claim 13, wherein said LCD is a normal-black transflective LCD.

* * * * *